Dec. 16, 1952   E. KARIG   2,621,545
CONTINUOUSLY REGULABLE DRIVE APPARATUS
Filed Sept. 26, 1950
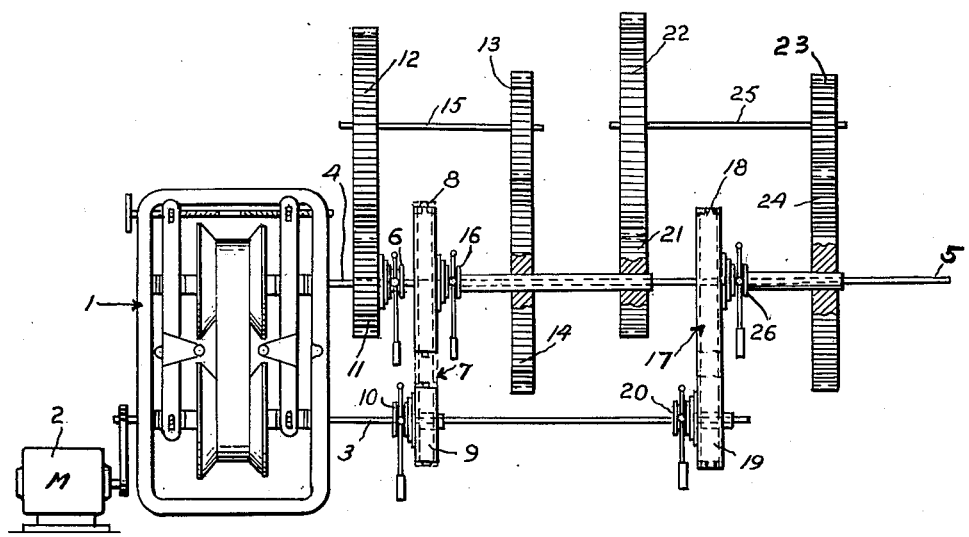
INVENTOR
*Erhardt Karig,*
BY
ATTORNEY Patented Dec. 16, 1952

2,621,545

UNITED STATES PATENT OFFICE 2,621,545

CONTINUOUSLY REGULABLE DRIVE APPARATUS

Erhardt Karig, Bad Homburg vor der Hohe, Germany, assignor to Patentverwertung W. Reimers G. m. b. H., Bad Homburg vor der Hohe, Germany Application September 26, 1950, Serial No. 186,703
In Switzerland October 6, 1949

3 Claims. (Cl. 74—745)

The ranges of speeds of revolution attainable with continuously regulable gearing of the usual kind lie within the order of magnitude of 1:6 and are therefore by no means adequate for many cases. Thus, for instance, in the case of machine tools regulating ranges of 1:40 and more are required. There is the further requirement, that these regulating ranges shall be run through without any break in the power transmission. Arrangements, with which it has been attempted to fulfill these requirements, have hitherto involved such a great amount of mechanism that these solutions have not been able to establish themselves in practice.

The present invention has for its object to provide gearing which with the simplest means enables the speed of revolution to be varied within very wide limits without any break in the power transmission. For this purpose the invention makes use of gearing consisting of a variable transmission and gearing following the latter and disconnectable couplings, by which the driven shaft of the variable transmission can be coupled either directly or through the intermediary of the gearing with the output shaft to be driven. The invention consists in this, that the fixed transmission ratio of the gearing is equal to the reverse total regulating range of the variable transmission and that between the driving shaft of the variable transmission and the output shaft gearing with a fixed transmission ratio which is equal to the ratio of one of the driven speed limits of the variable transmission to its driving speed and a coupling for connecting and disconnecting the gearing. The result of this is that the variable transmission is, when its driven shaft is directly coupled with the output shaft, first of all regulated out in one sense, that when the variable transmission is put out of operation by coupling its driving shaft with the output shaft and regulated back again and that finally, after a renewed coupling of the driven shaft of the variable transmission with the output shaft, the regulating range of the variable transmission can be again run through. This procedure can be repeated, if further subsequent stages of gearings with couplings, disposed between the driving shaft of the variable transmission and the output shaft, are provided, for the transmission ratios of which the corresponding aspects apply as above. Details will be gathered from the description of the constructional example which is illustrated diagrammatically in the accompanying drawing.

The apparatus according to the invention as illustrated comprises a variable transmission 1 of the Reeves type which is shown diagrammatically as including a V-belt extending between a sheave on a driving shaft 3 driven by a motor 2 having a fixed speed of revolution and a sheave on regulated driven shaft 4. The output shaft 5 which is to be driven at a variable speed of revolution can be connected by a selectively operable clutch 6 directly with the driven shaft 4. The output shaft 5 has also fixed on it one sprocket 8 of a chain transmission 7 of fixed transmission ratio, and the companion sprocket 9 of the transmission can be connected by a selectively operable clutch 10 with the driving shaft 3 of the variable transmission 1. Finally, there is also provided gearing consisting of two pairs of gears 11 and 12 and 13 and 14, the gears 12 and 13 of which are rigidly mounted on a countershaft 15. The gear 11 is rigidly mounted on the driven shaft 4 and the gear 14 can be coupled by a selectively operable clutch 16 with the output shaft 5. The remaining parts shown in the drawing will be described later. The regulating device of the variable transmission and the devices required for actuating the clutches are not shown. The transmission ratio between the gears 11 and 14 is equal to the reverse total regulating range of the variable transmission 1 and the transmission ratio of the chain transmission 7 is equal to the ratio of the lowest driven speed of the variable transmission 1 to its driving speed.

The gear operates as follows:

Let it be assumed, that the clutches 10 and 16 are disconnected, but that upon the clutch 6 being thrown in, the output shaft 5 is connected directly with the driven shaft 4 of the variable transmission 1. The parts being connected in this manner starting from the highest driven speed of the variable transmission, the latter can in the first instance be regulated down to its lowest speed, causing the same range of speed to be imparted to the output shaft 5. At the lowest driven speed the sprocket 8 of the transmission 7 will also have this speed, whilst the sprocket 9 of this transmission will, owing to its transmission ratio, have the speed of the driving shaft 3, that is to say will run synchronously with it. Consequently, with the parts connected up in this way, the sprocket 9 can be coupled by means of the clutch 10 with the driving shaft 3, and by releasing the clutch 6, the output shaft 5 can be separated from the driven shaft 4 without the drive of the output shaft 5 being disturbed. This shaft will now be driven by way of the clutch 10 and the transmission 7 directly from the driving shaft 3, the variable transmission 1 being out of operation. The variable transmission 1 can now be regulated up to its maximum driven speed, whereby, owing to the given transmission ratio between the gears 11 and 14, the said transmission will assume the lowest driven speed of the sprocket 8 and thereby of the output shaft 5. In consequence of the synchronising of the output shaft 5 and the gear 14 the two can now be coupled with one another by the clutch 16, the clutch 10 being released, without the drive of the output shaft 5 being disturbed by shock or interruption of power. The output shaft 5 is now driven by the driven shaft 4 running at its maximum speed by way of the gearing 11 to 14 and the clutch 16 with the lowest driven speed of the variable transmission 1. By regulating down the variable transmission the speed of revolution of the output shaft 5 can again be reduced in accordance with the total transmission ratio of the variable transmission 1, so that the regulating range of the output shaft is equal to the square of the regulating range of the variable transmission 1.

The drawing also shows, how the apparatus may be extended by the provision of further stages of transmissions, gearing and couplings corresponding to the transmission 7 and the gearing 11 through 15. One additional stage or extension is shown. Corresponding to the transmission 7 there is a chain transmission 17 with fixed transmission ratio, one sprocket 18 of which is fixed on the output shaft 5 and the other sprocket 19 coupled by a selectively operable clutch 20 with the driving shaft 3. The gearing corresponding to the gears 11 through 15 consists of the pairs of gears 21 and 22 and 23 and 24, gears 22 and 23 of which are mounted on the countershaft 25. The gear 21 is rigidly connected with the toothed wheel 14, whilst a clutch 26 is provided for coupling the gear 24 with the output shaft 5. The transmission ratio of the transmission 17 is equal to the product of the transmission ratio of the transmission 7 and the regulating range of the variable transmission 1, whilst the transmission ratio of the gearing 21 through 25 is equal to that of the gearing 11 through 15. Thus, for the lowest speed of revolution of the driven shaft 5, which can be attained through the sprocket 8 and gearing 11 through 15, the same conditions will obtain as previously for the lowest speed of the output shaft 5, when coupled directly to the driven shaft 4. Hence, starting with this speed, by throwing in the clutch 20 and releasing the clutch 16 and by regulating up the variable transmission 1 with subsequent throwing in of the clutch 26 and releasing the clutch 20 it is possible, by again regulating down the variable transmission 1, to run again through its regulating range, whereby the total regulating range is brought up to the third power of the regulating range of the variable transmission 1. This process may be continued by the provision of further stages of gearing—corresponding to 7 and 11 through 15 and 17 and 21 through 25—and couplings.

Each further transmission corresponding to the transmissions 7 and 17 has a transmission ratio equal to the product of the preceding gear and the regulating range of the variable transmission 1, whilst the transmission ratios of all gearing corresponding to the gears 11 through 15 and 21 through 25 are equal to one another.

Instead of starting from the maximum speed of revolution of the output shaft 5 attainable by the variable transmission 1 alone and by regulating down from there, it is possible to take the lowest speed as the starting point and to regulate up from it. In that case the transmission ratios of the subsequent stages of gearing will have the opposite values from those of the example described.

I claim:

1. A continuously regulable drive apparatus comprising a driving shaft and a driven shaft and a variable transmission extending between said shafts, means for driving the driving shaft, an output shaft, a clutch for selectively coupling the output shaft to the driven shaft, a transmission extending between the driving shaft and the output shaft, a clutch for selectively coupling the transmission to the driving shaft and a countershaft located adjacent the driven shaft, a driving connection between the driven shaft and the countershaft and between the countershaft and the output shaft and a clutch for selectively coupling said driving connection to the output shaft, the transmission ratio of the said driving connection being equal to the total regulating range of the variable transmission and the transmission ratio of the transmission between the driving shaft and output shaft being equal to the ratio between one of the limiting driven speeds of the variable transmission and its driving speed.

2. A continuously regulable drive apparatus as set forth in claim 1 wherein the driving connection between driven shaft and the countershaft comprises a pair of gears fixed to and located in spaced relation upon the countershaft with one of said gears engaging a gear fixed upon the driven shaft and the other of said gears engaging a second gear rotatably mounted upon the output shaft.

3. A continuously regulable drive apparatus as set forth in claim 1 wherein the transmission between the driving shaft and the output shaft, the clutch for selectively coupling the transmission to the driving shaft, the countershaft, the driving connection between the driven shaft and the countershaft and between the countershaft and the output shaft and the clutch for selectively coupling the driving connection to the output shaft all constitute a regulating stage between the variable speed transmission and the output shaft and said stages being duplicated in following order, the transmission ratio of the driving connection of each stage beyond the first being equal to that of the first stage and the transmission ratio of the transmission between the driving shaft and the output shaft being equal to that of the preceding stage multiplied by the regulating range of the variable transmission.

ERHARDT KARIG.

REFERENCES CITED

The following references are of record in the file of this patent:

UNITED STATES PATENTS

| Number | Name | Date |
|---|---|---|
| 1,505,427 | Reeves | Aug. 19, 1924 |

FOREIGN PATENTS

| Number | Country | Date |
|---|---|---|
| 243,182 | Switzerland | May 28, 1946 |